(12) United States Patent
Yu

(10) Patent No.: US 8,305,920 B2
(45) Date of Patent: Nov. 6, 2012

(54) METHOD, SYSTEM AND TERMINAL FOR DETERMINING QOS LEVEL

(75) Inventor: Yang Yu, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 598 days.

(21) Appl. No.: 12/524,919

(22) PCT Filed: Jul. 4, 2007

(86) PCT No.: PCT/CN2007/070235
§ 371 (c)(1),
(2), (4) Date: Jul. 29, 2009

(87) PCT Pub. No.: WO2008/122177
PCT Pub. Date: Oct. 16, 2008

(65) Prior Publication Data
US 2009/0323548 A1 Dec. 31, 2009

(30) Foreign Application Priority Data
Apr. 6, 2007 (CN) .......................... 2007 1 0090421

(51) Int. Cl.
*H04L 1/20* (2006.01)
(52) U.S. Cl. ............. 370/252; 370/395.21; 370/395.41; 725/105; 725/118; 725/110
(58) Field of Classification Search .................. None
See application file for complete search history.

(56) References Cited

U.S. PATENT DOCUMENTS

| 6,738,353 | B2 * | 5/2004 | Chong ........................... 370/241 |
| 6,801,497 | B1 | 10/2004 | Van Driessche |
| 7,089,580 | B1 * | 8/2006 | Vogel et al. ..................... 725/111 |
| 2007/0127487 | A1 * | 6/2007 | Kim et al. ...................... 370/392 |

FOREIGN PATENT DOCUMENTS

| CN | 1398087 A | 2/2003 |
| CN | 1604583 A | 4/2005 |
| CN | 1852230 A | 10/2006 |
| CN | 1937568 A | 3/2007 |
| WO | 99/11003 A1 | 3/1999 |

OTHER PUBLICATIONS

International Search Report: mailed Dec. 20, 2007; PCT/CN2007/070235.

* cited by examiner

*Primary Examiner* — Kibrom T Hailu
*Assistant Examiner* — Zewdu A Beyen
(74) *Attorney, Agent, or Firm* — Ladas & Parry LLP

(57) ABSTRACT

A method for determining Quality of Service (QoS) level is provided. The method includes: assigning, by a Coaxial-cable Line Terminal (CLT), a QoS level for a user terminal; sending, by the CLT, relevant information of the assigned QoS level to a Coaxial-cable Network Unit (CNU); and determining, by the CNU, a QoS level for a packet sent by the user terminal according to the relevant information of the assigned QoS level. A system for determining QoS level is provided. The system includes: a CLT and a CNU. A CLT and a CNU are also provided. The solution enables a coaxial-cable network unit to satisfy the QoS requirements of user terminals, and reduces the producing cost of the coaxial-cable network unit.

8 Claims, 3 Drawing Sheets

METHOD, SYSTEM AND TERMINAL FOR DETERMINING QOS LEVEL

FIELD OF THE INVENTION

The present invention relates to Ethernet technologies, and more particularly, to a method, system and terminal for determining Quality of Service (QoS).

BACKGROUND OF THE INVENTION

Ethernet Passive Coaxial Network (EPCN) is a technique based on Ethernet. It adopts a point-to-multipoint structure and adopts a passive coaxial-cable for transmission. In uplink, data flows are transmitted in Ethernet packet bursts.

FIG. 1 is a schematic diagram illustrating a network structure of an EPCN system. As shown in FIG. 1, the EPCN system mainly includes a Coaxial-cable Line Terminal (CLT), a branch/distributor and a plurality of Coaxial-cable Network Units (CNUs). The EPCN system is connected with various external Ethernet devices via the CLT and is connected with user terminals via the CNUs. The EPCN system is applicable for multiple services. And at present, the most popular application is Ethernet broadband to home for users in buildings.

In an EPCN system, each CNU is generally connected with multiple user terminals, e.g., a CNU may be connected simultaneously with an Internet Protocol Television (IPTV) set-top box, an IP phone terminal and a Personal Computer (PC). In practical applications, different user terminals have different QoS requirements. For example, the IPTV set-top box has a very high QoS requirement and the IP phone terminal has a relatively high QoS requirement, while the PC has a relatively low QoS requirement. Thus, in order to meet the QoS requirements of the user terminals, the CNU should be capable of determining QoS levels for packets from different user terminals after receiving the packets so as to process the packets differently. Current CNUs, however, have no such complex QoS identification functions in order to keep low cost. Therefore, the CNUs cannot determine QoS level for a packet according to multi-tuple information of the packet, and thus cannot satisfy different QoS requirements of different user terminals, which lowers the service quality of the EPCN system.

SUMMARY OF THE INVENTION

The present invention provides a method, a system, a Coaxial-cable Line Terminal (CLT) and a Coaxial-cable Network Unit (CNU) for determining QoS level, so as to enable the CNU in an Ethernet Passive Coaxial Network (EPCN) system to determine a QoS level for a packet.

The technical solution of the present invention is as follows.

According to an embodiment of the present invention, a method for determining QoS level is provided. The method includes: assigning, by a Coaxial-cable Line Terminal (CLT), a QoS level for a user terminal; sending, by the CLT, relevant information of the assigned QoS level to a Coaxial-cable Network Unit (CNU) which determines the QoS level for the user terminal according to the relevant information of the assigned QoS level.

According to another embodiment of the present invention, a system for determining QoS level is provided. The system includes: a CLT, adapted to assign a QoS level for a user terminal and send relevant information of the assigned QoS level to a CNU; the CNU, adapted to determine a QoS level for a packet sent by the user terminal according to the relevant information received.

According to another embodiment of the present invention, a CLT is provided. The CLT includes: a QoS level assignment module, adapted to assign a QoS level to a user terminal, and send relevant information of the assigned QoS level to an information exchange module, the information exchange module, adapted to send the relevant information of the assigned QoS level to a CNU.

According to another embodiment of the present invention, a CNU is provided. The CNU includes: a QoS information storage module, adapted to store relevant information of a QoS level assigned for a user terminal sent by a CLT; and an information processing module, adapted to receive a packet from a user terminal, determine a QoS level for the packet according to the relevant information of the QoS level assigned to the user terminal stored in the QoS information storage module.

According to another embodiment of the present invention, a method for implementing QoS to a plurality of user terminals in an Ethernet over coaxial-cable network is provided. The network includes a plurality of CNU devices for providing access for a plurality of user terminals and at least a CLT device for managing the plurality of CNU devices. The method includes: receiving, by the CLT device, a first packet of a user terminal, wherein the first packet is forwarded by a CNU device; determining, by the CLT device, QoS level of the user terminal according to a predetermined relationship between the user terminal and the QoS level; and instructing, by the CLT device, the CNU device to implement the QoS level for the user terminal when forwarding a second packet of the user terminal.

It can be seen from the present invention that, the CLT sends the relevant information of the QoS level assigned for the user terminal to the CNU, such that the CNU may determine the QoS level for a packet received from the user terminal. Thus, the CNU is able to determine the QoS level for the packet and process the packet according to the QoS level, which satisfies QoS requirements of different user terminals and enhances the quality of service provided by the EPCN system.

EMBODIMENTS OF THE INVENTION

The present invention will be described in detail hereinafter with reference to accompanying drawings and embodiments to make the solution and merits therein clearer.

At present, it is not possible to integrate a high performance QoS classification chip into a CNU due to cost control. But a CLT has a strong QoS classification capability. In other words, the CLT is capable of obtaining the QoS level of a user terminal and performing corresponding packet processing.

Based on the above characteristics, embodiments of the present invention provide a method for determining QoS level. In this method, a CLT assigns a QoS level for a user terminal and sends relevant information of the assigned QoS level to a CNU; the CNU determines a QoS level for a packet sent by the user terminal according to the relevant information of the assigned QoS level.

It can be seen that according to the method provided by embodiments of the present invention, the CNU is informed of the relevant information of the assigned QoS level by the CLT. Thus, the CNU is able to determine the QoS level for the packet from the user terminal according to the relevant information of the assigned QoS level informed by the CLT.

In the method of the present invention, the CLT may perform QoS level assignment when begin to receive packets from the user terminal, e.g. when receiving the first or the second packet from the user terminal. Alternatively, the CLT may also perform the QoS level assignment according to administrator's instructions.

Preferably, a default QoS level may be assigned for the user terminal in embodiments of the present invention. Thus, the CNU is able to process the packet from the user terminal according to the default QoS level when the relevant information of the assigned QoS level is not received from the CLT. Therefore, QoS requirement of the user terminals can be better satisfied.

Figure 1:
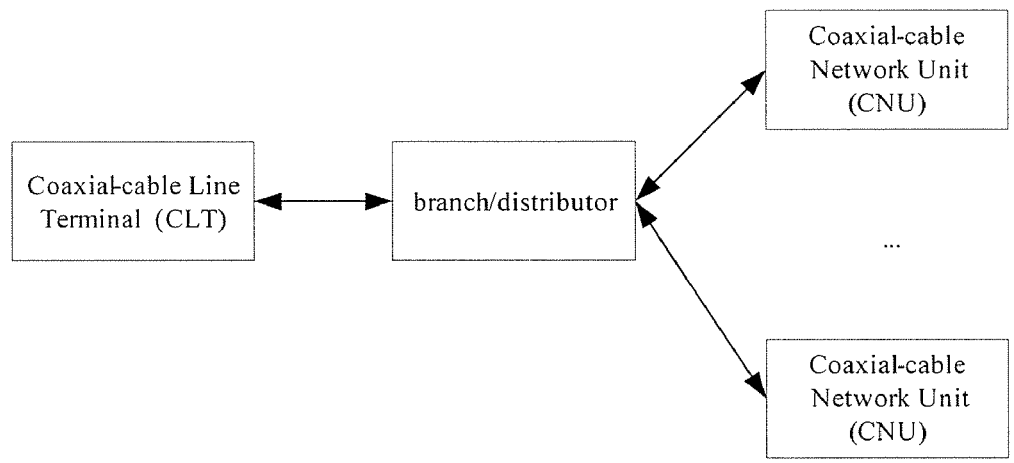
FIG. 1 is a schematic diagram illustrating a network structure of an EPCN network.
Figure 2:
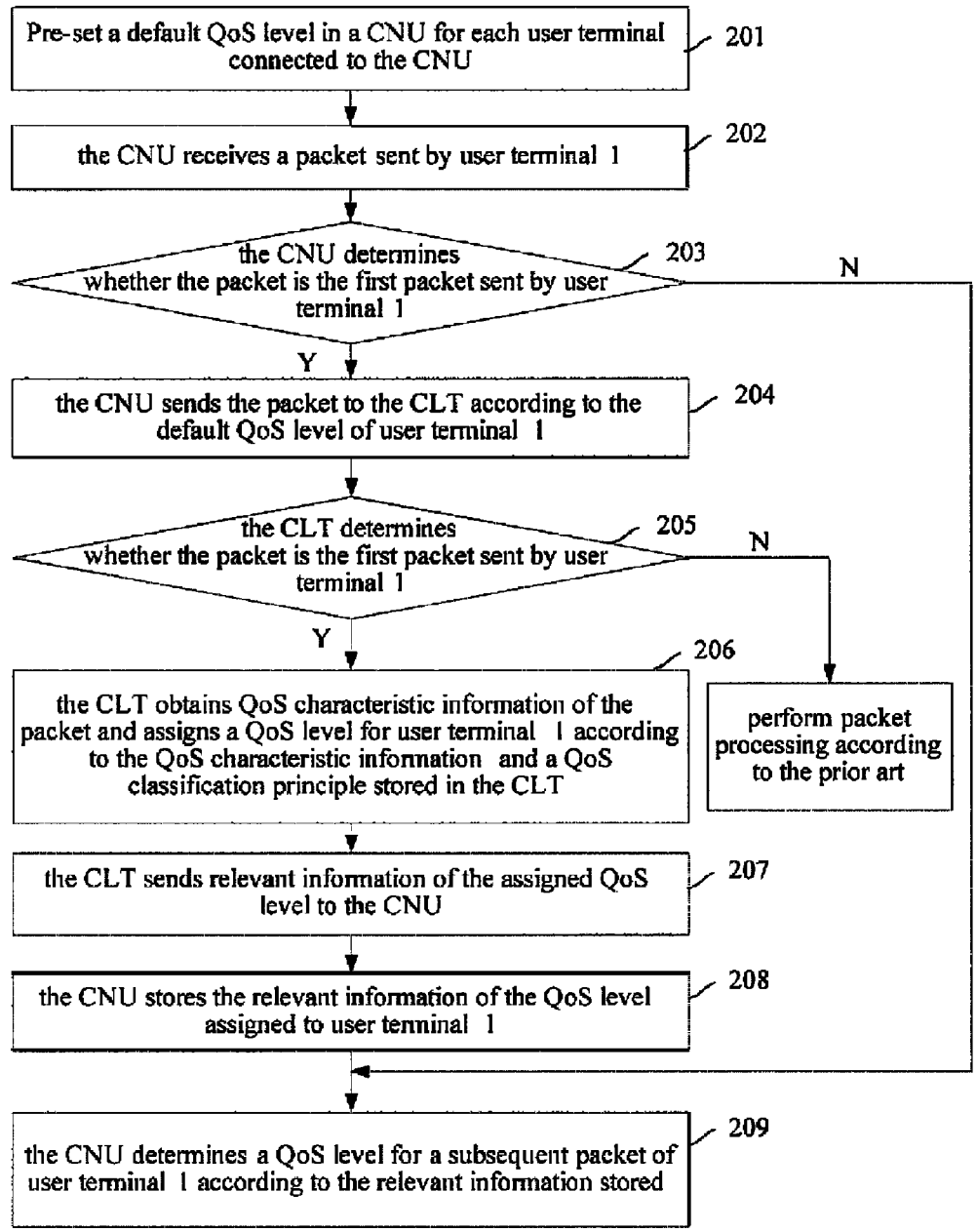
FIG. 2 is a flowchart illustrating a method for determining QoS level in an EPCN system in accordance with an embodiment of the present invention.

FIG. 2 is a flowchart illustrating a method for determining QoS level in the EPCN system in accordance with an embodiment of the present invention. As shown in FIG. 2, the method may include the following steps.

Step 201, pre-set a default QoS level in a CNU for each user terminal connected with the CNU.

The process of this step is to ensure that the CNU can process a packet from a user terminal according to the default QoS level when a CLT does not inform the CNU of the relevant information of the QoS level assigned for the user terminal.

Step 202, the CNU receives a packet from a user terminal, e.g. user terminal 1.

Step 203, the CNU determines whether the packet is the first packet sent by user terminal 1. If the packet is the first packet sent by user terminal 1, proceed to step 204, otherwise, proceed to step 209.

Since each user terminal has a fixed and unique Ethernet physical layer address such as Media Access Control (MAC) address, the CNU may determine whether the packet is the first packet sent by user terminal 1 based on a source MAC address of the packet. The detailed process may be as follows: pre-set in the CNU a list of user terminals from which packets have been received; when receiving a packet from user terminal 1 in this step, the CNU obtains a source MAC address from the packet and determines whether the source MAC address is stored in the list; if the source MAC address is stored in the list, determine the packet is not the first packet from user terminal 1, otherwise, determine the packet is the first packet from user terminal 1 and store the source MAC address in the list.

Step 204, the CNU sends the packet to the CLT according to the default QoS level of user terminal 1.

Suppose the default QoS level of user terminal 1 is the lowest level. Then the CNU may send the packet from user terminal 1 to the CLT after finishing processing of packets from other user terminals.

Step 205, the CLT determines whether the packet received is the first packet sent by user terminal 1. If the packet is the first packet sent by user terminal 1, proceed to step 206, otherwise, perform packet processing according to the prior art and end the procedure.

Herein, the CLT may determine whether the packet is the first packet sent by user terminal 1 based on the source MAC address of the packet. The detailed process may include: pre-set in the CLT a list of user terminals from which packets have been received; when receiving a packet, the CLT obtains the source MAC address from the packet and determines whether the source MAC address is stored in the list; if the source MAC address is stored in the list, determine the packet is not the first packet sent by user terminal 1; otherwise, determine the packet is the first packet sent by user terminal 1 and store the source MAC address in the list.

Step 206, the CLT obtains QoS characteristic information of the packet sent by user terminal 1, and assigns a QoS level for user terminal 1 according to the QoS characteristic information and a QoS classification principle stored in the CLT.

In this step, the QoS characteristic information may include the source address and/or destination address carried in the packet, such as five-tuple information carried in the packet, etc.

Step 207, the CLT sends relevant information of the assigned QoS level to the CNU.

In this step, the CLT may send the relevant information of the assigned QoS level to the CNU via an existing control message or a newly defined control message.

Step 208, the CNU stores the relevant information of the QoS level assigned for user terminal 1.

Step 209, the CNU receives a subsequent packet sent by user terminal 1, determines a QoS level for the packet according to the relevant information of the QoS level assigned for user terminal 1 stored in the CNU.

In step 207, the relevant information of the assigned QoS level sent by the CLT to the CNU may be a corresponding relationship between the address of user terminal 1 and the QoS level assigned for user terminal 1. Thus, in step 209, when receiving the subsequent packet from user terminal 1, the CNU determines the QoS level for the packet according to the corresponding relationship between the address of user terminal 1 and the QoS level assigned for user terminal 1. The address of user terminal 1 may be the source MAC address of user terminal 1.

In addition, after determining the QoS level for the packet sent by the user terminal, the CNU may process the packet according to the QoS level determined, e.g. transmit the packet preferentially according to the QoS level, or defer the transmission of the packet according to the QoS level, etc.

It can be seen from FIG. 2 that, the CLT assigns the QoS level for user terminal 1 after receiving the first packet sent by user terminal 1. In other embodiments of the present invention, the CLT may also assign the QoS level for user terminal 1 at other time, e.g., when receiving the second or the third packet sent by user terminal 1, or after receiving address information of user terminal 1 inputted by an administrator, etc.

In addition, in the method shown in FIG. 2, step 201 may be omitted. Thus, in step 204, the CNU may directly transmit the packet to the CLT without considering the QoS level.

Embodiments of the present invention also provide a system for determining QoS level. The system includes a CLT and a CNU; wherein the CLT is adapted to assign a QoS level for a user terminal and send relevant information of the assigned QoS level to the CNU; and the CNU is adapted to determine a QoS level for a packet sent by the user terminal according to the relevant information received.

In the system provided by embodiments of the present invention, the CNU may be further adapted to send a first packet sent by the user terminal to the CLT according to a default QoS level pre-set for the user terminal; and after receiving the first packet sent by the user terminal, the CLT performs the step of assigning the QoS level for the user terminal.

Figure 3:
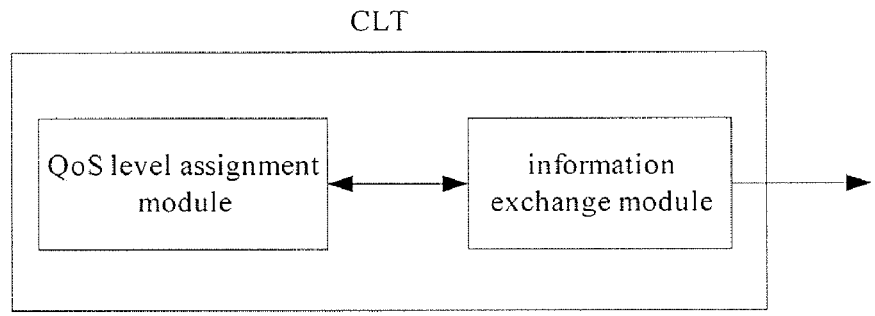
FIG. 3 is a schematic diagram illustrating an internal structure of a CLT in accordance with an embodiment of the present invention.

Embodiments of the present invention also provide a CLT. FIG. 3 is a schematic diagram illustrating an internal structure of a CLT in accordance with an embodiment of the present invention. According to FIG. 3, the CLT according to an embodiment of the present invention may include: a QoS level assignment module and an information exchange module; wherein the QoS level assignment module is adapted to assign a QoS level for a user terminal, and send relevant information of the assigned QoS level to the information exchange module;

the information exchange module is adapted to send the relevant information of the assigned QoS level to a CNU.

Referring to FIG. 3, the information exchange module may further be adapted to send a first packet sent by the user terminal received from the CNU to the QoS level assignment module; and the QoS level assignment module is further adapted to perform the step of assigning the QoS level after receiving the first packet sent by the user terminal.

In FIG. 3, when sending the relevant information of the assigned QoS level to the CNU, the information exchange module may send a corresponding relationship between a source MAC address of the user terminal and the assigned QoS level to the CNU via a control message.

Accordingly, embodiments of the present invention also provide a CNU.

Figure 4:
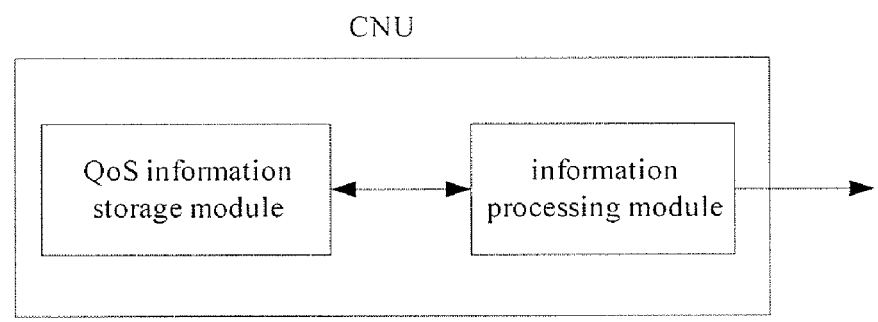
FIG. 4 is a schematic diagram illustrating an internal structure of a CNU in accordance with an embodiment of the present invention.

FIG. 4 is a schematic diagram illustrating an internal structure of the CNU in accordance with an embodiment of the present invention. As shown in FIG. 4, the CNU may include:

a QoS information storage module, adapted to store relevant information of a QoS level assigned for a user terminal sent by a CLT; and an information processing module, adapted to receive a packet from the user terminal, determine a QoS level for the packet according to the relevant information of the QoS level assigned for the user terminal stored in the QoS information storage module.

Referring to FIG. 4, the information processing module may further be adapted to obtain the relevant information of the QoS level assigned for the user terminal from a control message sent by the CLT, and store the relevant information of the assigned QoS level in the QoS information storage module.

In FIG. 4, the information processing module may further be adapted to receive a corresponding relationship between an address of the user terminal and the assigned QoS level, and store the corresponding relationship in the QoS information storage module.

In view of the foregoing embodiments of the present invention, a method for providing network service by a network device can also be obtained. The method can be used for providing network access service for users in a data network. The network includes at least one service level assignment device connected with the network device. The method may include the following steps.

Step a, provide a first packet sent by a user to the service level assignment device for user priority classification.

Step b, receive a classification result and determine a priority for processing subsequent packets of the user according to the classification result.

Through the descriptions of the above embodiments, a person with ordinary skill in the art should be clear that the present invention can be implemented by means of software together with a general broad sense computing device capable of running the software (which can be comprehended as a universal hardware platform), or by means of hardware design.

The foregoing description is only preferred embodiments of the present invention and not for use in limiting the protection scope thereof. Any modification, equivalent replacement and improvement made without departing from the principle of the present invention should be included in the protection scope thereof.

What is claimed is:

1. A method for determining Quality of Service (QoS) level, comprising:
   receiving, by a Coaxial-cable Line Terminal (CLT), a first packet of a user terminal from a Coaxial-cable Network Unit (CNU); wherein the first packet is transmitted by the CNU according to a default QoS level pre-set in the CNU for the user terminal;
   obtaining, by the CLT, QoS characteristic information from the first packet, assigning, by the CLT, a QoS level for the user terminal according to the QoS characteristic information and a QoS classification principle stored in the CLT;
   sending, by the CLT, relevant information of the assigned QoS level to the CNU which determines the QoS level for subsequent packets sent by the user terminal according to the relevant information of the assigned QoS level, wherein the sending the relevant information of the assigned QoS level to the CNU comprises: sending, by the CLT, a corresponding relationship between an address of the user terminal and the assigned QoS level to the CNU, which determines the QoS level for the subsequent packets sent by the user terminal according to the address of the user terminal carried in the subsequent packets and the corresponding relationship between the address of the user terminal and the assigned QoS level.

2. The method of claim 1, wherein the QoS characteristic information comprises a source address and/or a destination address carried in the first packet.

3. The method of claim 1, wherein the sending the relevant information of the assigned QoS level to the CNU comprises: sending, by the CLT, the relevant information of the assigned QoS level to the CNU via a control message.

4. The method of claim 1, further comprising:
   after determining the QoS level for the packet sent by the user terminal, processing, by the CNU, the packet sent by the user terminal according to the QoS level determined.

5. A system for determining Quality of Service (QoS) level, comprising:
   a Coaxial-cable Network Unit (CNU), configure to transmit a first packet of a user terminal to a Coaxial-cable Line Terminal (CLT) according to a default QoS level pre-set in the CNU for the user terminal;
   the CLT, configure to receive the first packet of the user terminal from the CNU, obtain QoS characteristic information from the first packet, assign a QoS level for a user terminal according to the QoS characteristic information and a QoS classification principle stored in the CLT and send relevant information of the assigned QoS level to the CNU;

the CNU is further configure to determine a QoS level for subsequent packets sent by the user terminal according to the relevant information received, wherein the send relevant information of the assigned QoS level to the CNU comprises: sending, by the CLT, a corresponding relationship between an address of the user terminal and the assigned QoS level to the CNU, which determines the QoS level for the subsequent packets sent by the user terminal according to the address of the user terminal carried in the subsequent packets and the corresponding relationship between the address of the user terminal and the assigned QoS level.

6. A Coaxial-cable Line Terminal (CLT), comprising:

an information exchange module, configure to receive a first packet of a user terminal from a Coaxial-cable Network Unit (CNU), and send the first packet to a Quality of Service (QoS) level assignment module; wherein the first packet is sent by the CNU according to a default QoS level pre-set in the CNU for the user terminal;

the QoS level assignment module, configure to receive the first packet, obtain QoS characteristic information from the first packet, assign a QoS level to the user terminal according to the QoS characteristic information and a QoS classification principle stored in the CLT, and send relevant information of the assigned QoS level to the information exchange module, the information exchange module is further configure to send the relevant information of the assigned QoS level to the CNU which determines the QoS level for subsequent packets sent by the user terminal according to the relevant information of the assigned QoS level, wherein the information exchange module is further configure to send a corresponding relationship between a source Media Access Control (MAC) address of the user terminal and the assigned QoS level to the CNU via a control message.

7. A Coaxial-cable Network Unit (CNU), comprising:

a Quality of Service (QoS) information storage module, configure to store relevant information of a QoS level assigned for a user terminal sent by a Coaxial-cable Line Terminal (CLT); and an information processing module, configure to receive a first packet from a user terminal, transmit the first packet to the CLT according to a default QoS level pre-set in the CNU for the user terminal, determine a QoS level for subsequent packets of the user terminal according to the relevant information of the QoS level assigned to the user terminal stored in the QoS information storage module, wherein the information processing module is further configure to receive a corresponding relationship between an address of the user terminal and the assigned QoS level, and store the corresponding relationship in the QoS information storage module, wherein the information processing module is further configure to determine the QoS level for the subsequent packets sent by the user terminal based on a source Media Access Control (MAC) address in the subsequent packets and the corresponding relationship between the source MAC address of the user terminal and the assigned QoS level stored in the QoS information storage module.

8. The CNU of claim 7, wherein the information processing module is further configure to obtain the relevant information of the assigned QoS level from a control message sent by the CLT, and store the relevant information of the assigned QoS level of the user terminal in the QoS information storage module.

* * * * *